Patented Jan. 13, 1931

1,788,625

UNITED STATES PATENT OFFICE

HAROLD L. LEVIN, OF NUTLEY, NEW JERSEY, ASSIGNOR, BY MESNE ASSIGNMENTS, TO THE PATENT AND LICENSING CORPORATION, OF BOSTON, MASSACHUSETTS, A CORPORATION OF MASSACHUSETTS

ARTIFICIALLY-COLORED GRANULE

No Drawing.   Application filed February 20, 1928.   Serial No. 255,860.

This invention relates to the manufacture of artificially colored granules and has more particular reference to methods of producing colored granules adapted for use in surfacing roofing.

While my invention will be particularly described in connection with the manufacture of prepared asphalt roofing, it should be understood that the colored granular material made in accordance with my invention may be applied to other types of roofing where a surfacing of this character is desired or essential, and may also be used for other purposes.

In the roofing industry and particularly in that branch which has to do with the manufacture of flexible and semi-flexible foundations of fibrous materials, it is the common practice to provide the base or foundation with an external protective coating, such as blown asphalt or the like, and in order to protect the coating from the deteriorating action of the weather and to provide the roofing with ornamental color effects, the coating has imbedded therein granular surfacing materials such as crushed slates or the like. While the protective value of the mineral surfacing is an important consideration, there is at the present time an increasing demand for roofing surfaced in pleasing color combinations and consequently the roofing manufacturer is constantly faced with the problem of procuring surfacing materials of a wide variety of colors and at the same time being sure that his supply in any given color is of a constant shade in order to insure uniformity in the product.

Methods have heretofore been proposed for artificially coloring mineral surfacing such as slate, by applying suitable coloring agents to a light colored mineral base, but these have generally been expensive to carry on, and furthermore, the color of the surfacing thus produced is in many instances not very permanent and is very often washed away when exposed to the elements.

One of the principal objects of my invention is to provide methods of treating granular materials so as to impart thereto any desired color or shade of color which will be lasting during the life of the roofing base to which it may be applied.

Another object of my invention is to employ for this purpose as a starting material, substances of which large and unlimited quantities are generally available in many localities and the properties of which may be utilized in accordance with my invention in a manner to affix coloring agents thereto, which latter will become, in effect, a part of the starting material and be united therewith in such a way that no perceptible alteration in the intensity of the color occurs under the conditions of use.

In accordance with my invention, I employ as the starting material to be colored, substances which are more or less porous and particularly of a cellular or vesicular structure, the surface of the pores or cells being of irregular contour and presenting numerous projections or crags enabling coloring agents to adhere readily to the surface and become permanently united therewith, particularly when these crags or projections are caused more or less to sinter or flow together. I have found that slags, for example, answer very well the purposes of my invention since they generally possess a structure as specified and at reasonably moderate retorting temperatures, the numerous projections on the surfaces of the cell-like structure thereof can be caused more or less to sinter or flow together without, however, causing the entire surface to be fused into a glass-like mass or globule.

In carrying out my invention, I may start, for example, with a blast furnace slag, and I first crush or otherwise reduce the same to a conglomerate, the smaller particles of which are retained on a 35 mesh sieve while the largest of which will pass an 8 mesh sieve, there being many particles of course, varying in size between these two limits. I then subject the crushed granules to the treatment for coloring the same. The coloring treatment, in accordance with my invention, consists, briefly, in impregnating the granules with solutions of metallic salts or the like, which can be transformed at elevated temperatures into pigments or coloring agents of desired color and shade, and then drying the granules and retorting the same, in order to bring out the desired color.

The highly porous nature of granules of this character permits the absorption of solutions of coloring salts in sufficient quantities to become adsorbed onto the entire surface of the granule, so as to wet substantially completely the surfaces and be retained thereon until the material has been subjected to the desired conversion temperatures. In order to assist the impregnation of the granules and cause the coloring solution to more completely permeate the same, I prefer to submerge a mass of the granules beneath the surface of a bath of the coloring solution and then subject the bath to vacuum conditions, so as more effectively to force the liquid into the pores and fissures of the granules. After the granules have been impregnated to a sufficient depth, the vacuum may be relieved and if desired the bath may then be subjected to superatmospheric pressure, so as to increase further the impregnation of the granule with the coloring solution. In any event however, after the desired amount of impregnation has been attained, the granules are removed from the bath and dried and thereafter subjected to a treatment which will transform the metallic salt or other coloring agent into a pigment.

In carrying on the impregnation of the granular material in a continuous manner, it is necessary, of course, to replenish the bath with the metallic salt solution so as to maintain a substantially constant concentration of the salt in order to insure uniformity in the final color.

The wet impregnated granules, after removal from the bath, are dried in any convenient way, preferably by being conveyed over chutes to the retort or furnace, which chutes may be in proximity to similar chutes carrying granules discharged from the retort, and which have already received the necessary heat treatment and must then be cooled down to lower temperatures. The arrangement is preferably such as to provide a counter-current heat exchange effect between the hot granules to be cooled and the wet granules to be dried.

The material in any event, should be dried so as to remove the water therefrom before being introduced into the retort for the purpose of transforming the coloring agent to the pigment of desired shade.

The colors which may be brought out during the retorting of the granules will depend not only upon the temperatures but also upon the concentration of metallic salt deposited by the impregnating solution within the pores of the granules and upon the surfaces thereof. In general the more concentrated the impregnating solution, the deeper will be the colors developed. The temperatures in the retort may vary from 1000 to 2000 degrees F. depending upon the color desired. By regulating the concentration of the salt and discontinuing the heat treatment at various retorting temperatures, a wide range of colors may be obtained from a single coloring solution, and for any given concentration, a constant degree of heat treatment will produce a uniform color thus enabling the manufacturer not only to produce many different colors but by a suitable control of the operating conditions the uniformity of the product can always be maintained.

As an illustration of one specific embodiment of my invention, I have produced a bright red colored granule by heat treating blast furnace slag impregnated with ferrous sulphate acidulated with a very small percentage of sulphuric acid in order to prevent the basic nature of the slag from precipitating the iron from solution. The intensity of the color developed with this salt may, if desired, be increased by the addition of potassium acid sulphate to the impregnating solution. The ferric oxide colors developed in this treatment, may vary through different shades of brown and red depending upon the reaction temperature.

In another embodiment I have been able to produce a very pleasing salmon color by substituting phosphoric acid for the potassium acid sulphate in the example first given. I have also embodied the principles of my present invention in the production of green colored granules by employing soluble chromates such as sodium and potassium dichromate as the coloring solution. With this material, at elevated temperatures in the retort ranging from 1000° F. to 1800° F., the chromate salt is converted to chromic oxide which will impart various shades of green to the granule depending upon the temperature attained in the retorting. By means of other salts which can thus be converted by heat into pigments or colored coatings a large variety of colors and shades may be produced.

Where the color developed by the heat treatment partakes of the nature of a continuous film or coating, as in the case of the chrome oxide greens, rather than a powdery pigment as in the case of the iron oxides, the colored coating is generally affixed with sufficient permanence upon the surfaces of the granules. Where, however, the color developed from the impregnating solution by the retorting action is of a powdery nature, the pigment thus developed becomes enclosed within the pores and cells of the granule and mechanically bonded therein under the incipient fusion and sintering together of at least the more microscopic of the teeth and projections on the surfaces of the granules. The incipient fusion of slag or similar granules and the sintering of the surfaces thereof generally occurs at temperatures ranging from 2000 to 2200° F.

It should be understood, however, that even at the upper limits of the temperature, which I employ, the colored granule still retains a rough and uneven surface appearance since in accordance with my invention, the fusion and sintering action is localized upon the numerous surfaces of the cell-like structure of the granule, and is not sufficient to cause the entire granule to fuse as a whole, into a glass-like vitreous mass or globule. Vitreous surfaced granules are much more difficult to securely imbed in a coating layer of asphalt or the like, and hence the production of granules of this character for roofing purposes is to be avoided, in accordance with my invention.

The aforesaid localized fluxing or sintering is to some extent assisted by the pigment deposited upon the surfaces under the reaction temperatures in the retort, but where at any given temperature, it is desired to effect a greater degree of fluxing than may ordinarily be attained at that temperature, I may assist the fluxing action by incorporating wellknown fluxing agents such as metallic borates and phosphates, boric acid, soda, potash, and the like, into the coloring solution with which the granules are impregnated. Under the temperatures of the heat treatment these fluxing agents readily fuse and become attached to the surfaces of the granule and serve also to lower the fusion point of the granule surfaces so as to enable the sintering effect to take place more readily.

Instead of introducing the fluxing agent as a solution with the coloring solution, the fluxing material may be added as a dry powder, commingling it with the granules after removal from the impregnating bath but while they are still wet with the coloring solution. In some instances it may be desirable to heat the granules in the retort and then add the dry fluxing powder and ignite the granules a second time thereby to develop the desired shade and glaze.

The coloring deposited upon the granules and bonded to the surfaces thereof by the sintering action as described, becomes, in effect, a part of the granule itself so that it adheres thereto with considerable tenacity. The relative permanence of the colors thus produced renders the granules particularly suitable for use as a surfacing for roofing, where it is necessary that the coloring be not readily washed away by rain.

Furthermore, granules of this character are particularly advantageous as a surfacing for roofing granules because of their highly porous cellular nature and consequent low apparent specific gravity, so that for a given area of roofing surfaced with these granules, the weight of the product is considerable less than the same area surfaced with crushed slate or stone or similar relatively impervious mineral.

I claim as my invention:

1. A colored granule comprising a slag particle having a coloring agent produced in situ and fused into the pores and on the surfaces thereof by a sintering together of the irregular formation usually present on said surfaces, said granule being of unvitrified surface texture.

2. Granular material suitable for use as a surfacing for roofing material, comprising granules of blast furnace slag having a coloring substance produced in situ and fused onto the surfaces thereof by the sintering together of the microscopic projections on said surfaces, said granules being of unvitrified surface texture.

3. Granules suitable for use as a surfacing and roofing material, comprising granules of blast furnace slag having a coloring oxide produced in situ and fused onto the surfaces thereof by the sintering together of the microscopic projections on said surfaces, said granules being of substantially unvitrified surface texture.

HAROLD L. LEVIN.